US005492234A

United States Patent [19]

Fox, III

[11] Patent Number: 5,492,234

[45] Date of Patent: Feb. 20, 1996

[54] METHOD FOR FABRICATING SPACER SUPPORT STRUCTURES USEFUL IN FLAT PANEL DISPLAYS

[75] Inventor: Angus C. Fox, III, Boise, Id.

[73] Assignee: Micron Technology, Inc., Boise, Id.

[21] Appl. No.: 322,809

[22] Filed: Oct. 13, 1994

[51] Int. Cl.$^6$ .............................. B29D 11/00; B44C 1/22

[52] U.S. Cl. ................................ 216/25; 216/33; 216/36; 216/39

[58] Field of Search ................................ 216/25, 33, 36, 216/39, 67; 156/633.1, 655.1, 643.1

[56] References Cited

U.S. PATENT DOCUMENTS

| | | | |
|---|---|---|---|
| 3,843,427 | 10/1974 | Esdonk et al. | 156/3 |
| 3,953,756 | 4/1976 | Mondroy et al. | 313/220 |
| 4,091,305 | 5/1978 | Poley et al. | 313/586 |
| 4,183,125 | 1/1980 | Meyer et al. | 445/24 |
| 4,292,092 | 9/1981 | Hanak | 148/1.5 |
| 4,422,731 | 12/1983 | Droguet et al. | 350/344 |
| 4,451,759 | 5/1984 | Heynisch | 313/495 |
| 4,749,840 | 6/1988 | Piwexyk | 219/121 |
| 4,874,461 | 10/1989 | Sato et al. | 156/633 |
| 4,892,592 | 12/1990 | Dickson et al. | 136/244 |
| 4,923,421 | 5/1990 | Brodie et al. | 445/24 |
| 4,973,378 | 11/1990 | Lee et al. | 156/633 |
| 5,011,391 | 4/1991 | Kawasaki et al. | 445/24 |
| 5,083,958 | 1/1992 | Longo et al. | 445/24 |
| 5,129,850 | 7/1992 | Kane et al. | 445/24 |
| 5,205,770 | 4/1993 | Lowrey et al. | 445/24 |
| 5,232,549 | 8/1993 | Cathey et al. | 456/633 |

FOREIGN PATENT DOCUMENTS

| | | |
|---|---|---|
| 60-49626 | 3/1985 | Japan . |
| 1-220330 | 2/1988 | Japan . |
| 2-165540 | 12/1988 | Japan . |
| 3-179630 | 8/1991 | Japan . |

OTHER PUBLICATIONS

A. Bsiesy, F. Gaspard, R. Herino, M. Ligeon, and F. Muller, "Anodic Oxidation of Porous Silicon Layers Formed on Lightly p–Doped Substrates", *J. Electrochem. Soc.*, vol. 138, No. 11, Nov. 1991, pp. 3450–3456.

Rolfe C. Anderson, Richard S. Muller, and Charles W. Tobias, "Investigations of the Electrical Properties of Porous Silicon", *J. Electrochem. Soc.*, vol. 138, No. 11, Nov. 1991, pp. 3406–3411.

Hiedeki Koyama and Nobuyoshi Koshida, "Photoelectrochemical Effects of Surface Modification of n–Type Si with Porous Layer", *J. Electrochem. Soc.* vol. 138, No. 1, Jan. 1991, pp. 254–260.

Nobuyosi Koshida and Kazuhiko Exhizenya, "Characterization Studies of p–Type Porous Si and Its Photoelectrochemical Activation", *J. Electrochem. Soc.*, vol. 138, No. 3, Mar. 1991, pp. 837–841.

Y. H. Xie, W. L. Wilson, F. M. Ross, J. A. Mucha, E. A. Fitzgerald, J. M. Macaulay, "Luminescence and structural study of porous silicon films", *J. Appl. Phys.* 71 (5), Mar. 1992, pp. 2403–2407.

Tomoyoshi Motohiro, Tetsu Kachi,Fusayoshi Miura, Yasuhiko Takeda, Shi–aki Hyodo, and Shoji Noda, "Excitaton Spectra of the Visible Photoluminesence of Anodized Porous Silicon", *J. Appl. Phys.*, 1992.

Dennis R. Turner, "Electropolishing Silicon in Hydrofluoric Acid Solutions", *Journal of The Electrochemical Society,*

(List continued on next page.)

*Primary Examiner*—William Powell
*Attorney, Agent, or Firm*—Lia M. Pappas

[57] ABSTRACT

A method is provided for forming inter-electrode spacers useful in flat panel display devices which comprises placing a mold on a first electrode plate. The mold has openings with corresponding diameters. The mold is coated with a conformal film which lines the openings, thereby decreasing the diameters of the openings. The openings are filled with a glass material. The conformal film is selectively removed, and the mold is separated from the electrode.

20 Claims, 3 Drawing Sheets

OTHER PUBLICATIONS

Jul. 1958, pp. 402–408.

Kazuo Imai and Hideyuki Unno, "FIPOS (Full Isolation by Porous Oxidated Silicon) Technology and Its Application to LSI's ", IEEE Transactions On Electron Devices, vol. ED–31, No. 3, Mar. 1984, pp. 297–301.

H. Seidel, L. Csepregi, A. Heuberger, H. Baumgartel, "Anisotropic Etching of Crystalline Silicon in Alkaline Solutions, II Influence of Dopants", J. Electrochem. Soc., vol. 137, No. 11, Nov. 1990, pp. 3626–3632.

M. I. J. Beale, N. G. Chew, M. J. Uren, A. G. Cullis, and J. D. Benjamin, "Microstructure and formation mechanism of porous silicon", Appl. Phys. Lett. 46(1), Jan. 1985, pp. 86–88.

Yoshinobu Arita and Yoshio Sunohara, "Formation and Properties of Porous Silicon Film", *Journal of Electrochemical Society, Solid State Science Technology,* vol. 124, No. 2, pp. 285–295.

T. George, M. S. Anderson, W. T. Pike, T. L. Lin, and R. W. Fathauer, "Microstructural investigations of light–emitting porous Si layers", Appl. Phys. Lett., vol. 60, No. 19, May 11, 1992, pp. 2359–2361.

S. O. Izidinov, A. P. Blokhina, and L. A. Ismailova, "Anomalously High Photovoltaic Activity Of Polished n–Type Silicon During Anodic Porous–Layer Formation In Hydrofluoric–Acid Solutions", *Elektrokhimiya,* vol. 23, No. 11, pp. 1554–1559, Nov., 1987 (Translated), Original article submitted May 8, 1986. This article: V.I. Lenin All–Union Electrotecnical Institute, Moscow, pp. 1452–1457.

R. L. Smith and S. D. Collins, "Porous Silicon Formation Mechanisms", *J. Appl. Phys.* 71 (8), Apr. 15, 1992, pp. R1–R22.

Yoshitaka Terao et al., "Fabrication of Fine Barrier Ribs for Color Plasma Display Panels by Sandblasting", *Oki Electric Industry Co., Ltd. *Research Laboratory,* **Electronic Devices Section, pp. 1–7.

Chris Curtin, "The Field Emission Display: A New Flat Panel Technology", *IEEE,* 1991, pp. 12–15.

N. C. Jaitly, T. S. Sudarshan, "Novel Insulator Designs For Superior DC Hold–Off In Bridged Vacuum Gaps", *IEEE Transactions on Electrical Insulation,* vol. EI–22 No. 6, Dec. 1987, pp. 801–810.

R. Meyer, "LP 09 6" Diagonal Microtips Fluorescent Display For T.V. Applications, International Display Research Conference, 1990.

A. Ghis, R. Meyer, P. Rambaud, F. Levy, T. Leroux, "Sealed Vacuum Devices: Fluorescent Microtip Diplays", IEEE Transactions On Electron Devices, vol. 38, No. 10, Oct. 1991, pp. 2320–2322.

S. Sakamoto, K. Kato, "A Screen–printing Process for the Fabrication of Plasma Display Panels", Kyushu Noritake Co., Ltd., Asakura, Fukuika, Japan, pp. 127–130.

METHOD FOR FABRICATING SPACER SUPPORT STRUCTURES USEFUL IN FLAT PANEL DISPLAYS

FIELD OF THE INVENTION

This invention relates to field emission devices, and more particularly to processes for creating the spacer structures which can provide support against the atmospheric pressure on the flat panel display without impairing the resolution of the image.

BACKGROUND OF THE INVENTION

It is important in flat panel displays of the field emission cathode type that an evacuated cavity be maintained between the cathode electron emitting surface and its corresponding anode display face (also referred to as an anode, cathodoluminescent screen, display screen, faceplate, or display electrode).

There is a relatively high voltage differential (e.g., generally above 200 volts) between the cathode emitting surface (also referred to as base electrode, baseplate, emitter surface, cathode surface) and the display screen. It is important that electrical breakdown between the electron emitting surface and the anode display face be prevented. At the same time, the narrow spacing between the plates is necessary to maintain the desired structural thinness and to obtain high image resolution.

The spacing also has to be uniform for consistent image resolution, and brightness, as well as to avoid display distortion, etc. Uneven spacing is much more likely to occur in a field emission cathode, matrix addressed flat vacuum type display than in some other display types because of the high pressure differential that exists between external atmospheric pressure and the pressure within the evacuated chamber between the baseplate and the faceplate. The pressure in the evacuated chamber is typically less than $10^{-6}$ torr.

Small area displays (e.g., those which are approximately 1" diagonal) do not require spacers, since glass having a thickness of approximately 0.040" can support the atmospheric load, but as the display area increases, spacer supports become more important. For example, a screen having a 30" diagonal measurement will have several tonnes of atmospheric force exerted upon it. As a result of this tremendous pressure, spacers will play an essential role in the structure of the large area, light weight, displays.

Spacers are incorporated between the display faceplate and the baseplate upon which the emitter tips are fabricated. The spacers, in conjunction with thin, lightweight, substrates support the atmospheric pressure, allowing the display area to be increased with little or no increase in substrate thickness.

Spacer structures must conform to certain parameters. The supports must 1) be sufficiently non-conductive to prevent electrical breakdown between the cathode array and the anode, in spite of the relatively close inter-electrode spacing (which may be on the order of 100 microns), and relatively high inter-electrode voltage differential (which may be on the order of 200 or more volts); 2) exhibit mechanical strength such that they exhibit only slow deformation over time to provide the flat panel display with an appreciable useful life; 3) exhibit stability under electron bombardment, since electrons will be generated at each of the pixels; 4) be capable of withstanding "bakeout" temperatures of around 400° C. that are required to create the high vacuum between the faceplate and backplate of the display; and 5) be of small enough size so as to not to visibly interfere with display operation.

There are several drawbacks to the current spacers and methods. One disadvantage is need for the spacer supports to be relatively large, having diameters in the range of 50 microns, in order to render innocuous the small amount of isotropic distortion (i.e., undercutting of the spacers) that inevitably occurs during anisotropic (plasma) etches. In other words, if the spacers are too narrow, they will tend to bend slightly during the long etching process which is used to eliminate the material surrounding the spacer.

Those known processes which involve the use of attaching and aligning pre-made spacers to the electrodes tend to be very unreliable, tedious and expensive.

SUMMARY OF THE INVENTION

The process of the present invention enables the fabrication of high aspect ratio support structures that do not interfere with the display resolution. The spacers formed by the process of the present invention have a diameter of approximately 25–30 microns which is invisible to the human eye when it occurs in a pixel having a width of approximately 170 microns.

One aspect of the present invention is a method for forming inter-electrode spacers useful flat panel display devices which comprises placing a mold on a first electrode plate. The mold has openings with corresponding diameters. The mold is coated with a conformal film which lines the openings, thereby decreasing the diameters of the openings. The openings are filled with a glass material. The conformal film is selectively removed, and the mold is separated from the electrode.

Another aspect of the present invention is a process for the formation of inter-electrode support structures comprising conformal depositing a layer of nitride over a mold. The mold has openings which are filled with a support material. The support material is selectively etchable with respect to the nitride. The nitride layer is etched away, and the mold is physically removed from the support material, thereby exposing the inter-electrode support structures.

A further aspect of the present invention is a method for fabricating spacers supports for an evacuated display. The method comprises the steps of providing a mold in a substrate, which mold comprises openings having diameters. The mold is lined with a lining material, thereby decreasing the diameters of the openings. The mold is filled with support forming material, and attached to a first electrode plate. The lining material is selectively removed. The mold is removed from the support forming material to expose the support structures, and the first electrode plate is attached and sealed to a second electrode plate.

BRIEF DESCRIPTION OF THE DRAWINGS

The present invention will be better understood from reading the following description of nonlimitative embodiments, with reference to the attached drawings, wherein below.

It should be emphasized that the drawings of the instant application are not to scale but are merely schematic representations and are not intended to portray the specific parameters or the structural details of a flat panel display which are well known in the art.

DETAILED DESCRIPTION OF THE INVENTION

Figure 1:
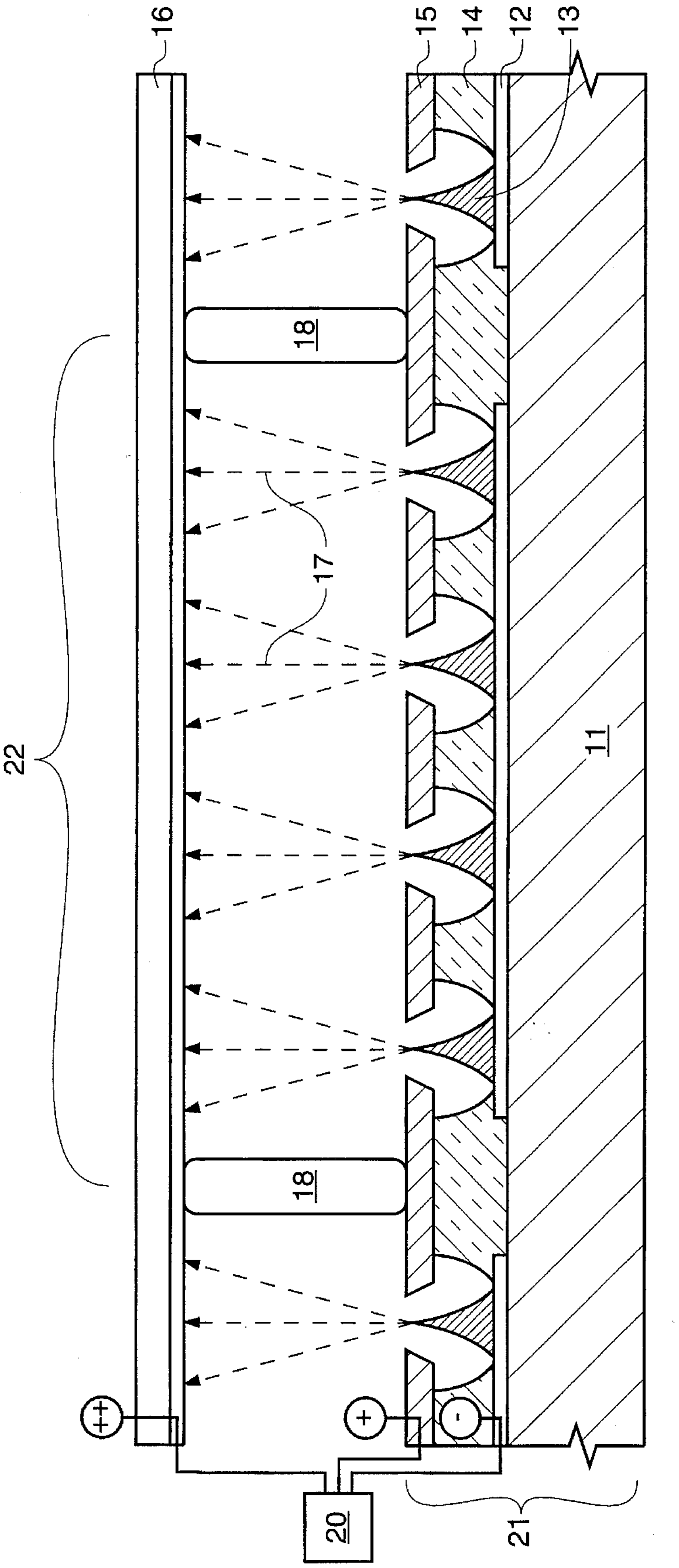
FIG. 1 is a schematic cross-section of a representative pixel of a field emission display comprising a faceplate with a phosphor screen, vacuum sealed to a baseplate which is supported by the spacers formed according to the process of the present invention.

Referring to FIG. 1, a representative field emission display employing a display segment 22 is depicted. Each display segment 22 is capable of displaying a pixel of information, or a portion of a pixel, as, for example, one green dot of a red/green/blue full-color triad pixel.

Preferably, a single crystal silicon layer serves as a substrate 11. Alternatively, amorphous silicon deposited on an underlying substrate comprised largely of glass or other combination may be used as long as a material capable of conducting electrical current is present on the surface of a substrate so that it can be patterned and etched to form micro-cathodes 13.

At a field emission site, a micro-cathode 13 has been constructed on top of the substrate 11. The micro-cathode 13 is a protuberance which may have a variety of shapes, such as pyramidal, conical, or other geometry which has a fine micro-point for the emission of electrons. Surrounding the micro-cathode 13, is a grid structure 15. When a voltage differential, through source 20, is applied between the cathode 13 and the grid 15, a stream of electrons 17 is emitted toward a phosphor coated screen 16. Screen 16 is an anode.

The electron emission tip 13 is integral with substrate 11, and serves as a cathode. Gate 15 serves as a grid structure for applying an electrical field potential to its respective cathode 13.

A dielectric insulating layer 14 is deposited on the conductive cathode 13, which cathode 13 can be formed from the substrate or from one or more deposited conductive films, such as a chromium amorphous silicon bilayer. The insulator 14 also has an opening at the field emission site location.

Disposed between said faceplate 16 and said baseplate 21 are located spacer support structures 18 which function to support the atmospheric pressure which exists on the electrode faceplate 16 as a result of the vacuum which is created between the baseplate 21 and faceplate 16 for the proper functioning of the emitter tips 13.

The baseplate 21 of the invention comprises a matrix addressable array of cold cathode emission structures 13, the substrate 11 on which the emission structures 13 are created, the insulating layer 14, and the anode grid 15.

Figure 2:
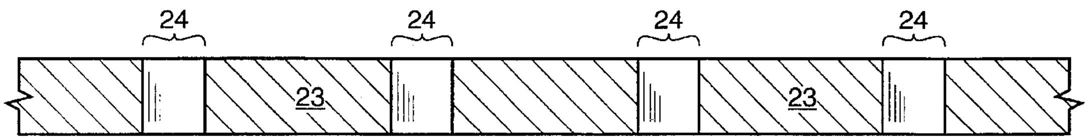
FIG. 2 is a schematic cross-section of a mold of the type used in the process of the present invention.

The process of the present invention provides a method for fabricating high aspect ratio support structures to function as spacers 18. Referring to FIG. 2, there is illustrated a mold or template 23 created for use in the process of the present invention. Preferably the mold 23 is fabricated from a ceramic laminate or other suitable material or substrate. Multi-layered ceramic laminates are available from Kyocera Corp.

The mold 23 is made by drilling or punching holes 24 (or openings) through the ceramic substrate 23. The holes 24 are punched through while the ceramic material 23 is unfired. After the ceramic 23 has been fired, the holes 24 are drilled. The holes 24 are relatively uniform in diameter, and represent the locations where the spacer support structures 18 are formed. The holes 24 preferably have a circular shape, but other geometries are also possible. The spacers 18 are formed within the holes 24, and are preferably centered therein.

In one embodiment of the present invention (not shown), the mold 25 is attached to one of the electrode plates 16 or 21, at this stage. The mold is preferably attached to the baseplate 21. An oxide material is preferably deposited superjacent the emission structure 13 during the spacer 18 fabrication to protect the emitters 13, and subsequently removed. In this embodiment, the coating material 25 is preferably removed with an anisotropic etch, i.e., an etch which removes material in a substantially vertical direction. Some possible etch chemistries comprise hydrogen halides and fluorine-containing compounds, such as HCl and HBr, and $NF_3$ or $CHF_3$ or $CF_4$, respectively.

Figure 3:
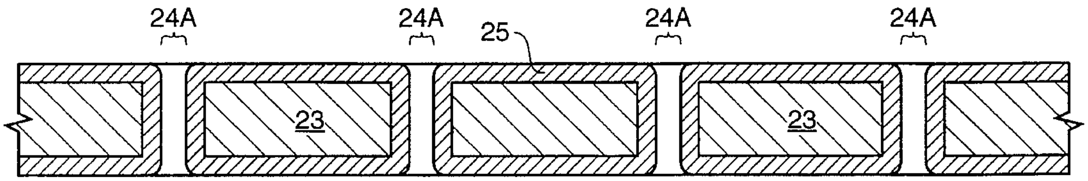
FIG. 3 is a schematic cross-section of the mold of FIG. 2, after the mold is coated with a film, according to the process of the present invention.

Another embodiment is shown in FIG. 3, which illustrates the mold 23 after the mold 23 has been coated with a film 25. The film 25 is preferably a nitride, such as silicon nitride, which is easily deposited. The film 25 should be selectively etchable with respect to the material 18, which ultimately functions as the spacer structure 18.

The film 25 or coating is conformal in nature, and lines the holes or openings 24, as well as the top and bottom surfaces of the mold 23, in a uniform manner. As a result, the conformal film 25 decreases the diameter of the openings **24*a*, thereby enabling the fabrication of narrower spacer structures 18. The diameter of the spacer structures 18** formed by the process of the present invention is between 25–30 μm.

The film 25 is preferably formed through chemical vapor deposition (CVD), but other suitable methods known in the art can also be used.

Figure 4:
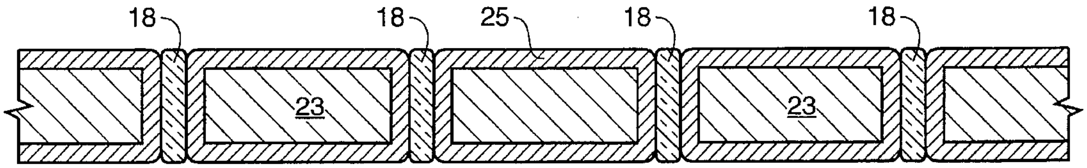
FIG. 4 is a schematic cross-section of the mold of FIG. 3, after the mold has been filled with a material, according to the process of the present invention.

After the diameter of the openings **24*a* has been adjusted, the spacer material 18 is disposed therein, preferably by a deposition method. FIG. 4 illustrates the manner in which the spacer material 18 fills the openings 24*a***.

The spacer material 18 preferably comprises a glass or silicate, such as borophosphosilicate glass (BPSG) or spin-on-glass (SPG). The lining 25 of the openings **24*a* is selectively etchable with respect to the silicate material 18 filling the openings 24*a***.

Figure 5:
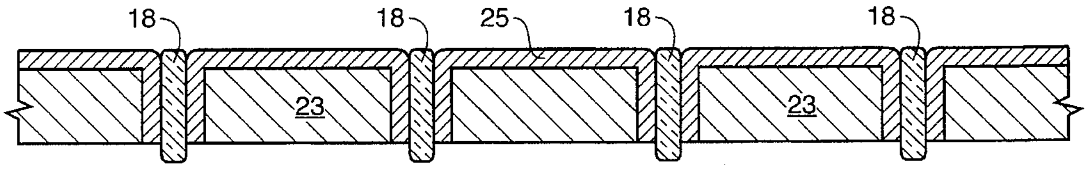
FIG. 5 is a schematic cross-section of the mold of FIG. 4, after the film has been removed from one side of the mold, thereby exposing the material, according to the process of the present invention.

FIG. 5 depicts the mold 23, after the film 25 has been removed from the lower surface of the mold 23, thereby exposing at least a portion of the spacer material 18. The film is removed using a selective nitride to oxide etch, such as a hydrogen halide and a fluorine-containing compound. The hydrogen halide is preferably HCl or HBr, and the fluorine-containing compound is preferably $NF_3$ or $CHF_3$ or $CF_4$.

Additionally, the silicate material 18 is strong enough to support the electrode plates 16 and 21, without substantially impairing the resolution of the image produced at the pixel site 22. Further, the spacer material 18 is not significantly effected by the electron emission 17 occurring at the pixel site 22.

Figure 6:
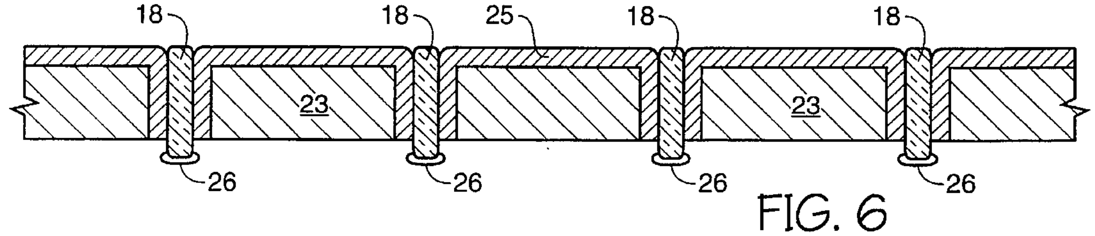
FIG. 6 is a schematic cross-section of the mold of FIG. 5, after an adhesive has been applied to the exposed portions of the material, according to the process of the present invention.

An adhesive 26 is applied to the exposed ends of the spacer structures 18, as shown in FIG. 6. The adhesive is preferably a silica based material that does not degrade under high temperatures, since the display must undergo a "bake out" process for the formation of the vacuum between the electrodes 16 and 21. Such types of sealants include frit seals. Alternatively, a temperature resistant epoxy can also be used.

Figure 7:
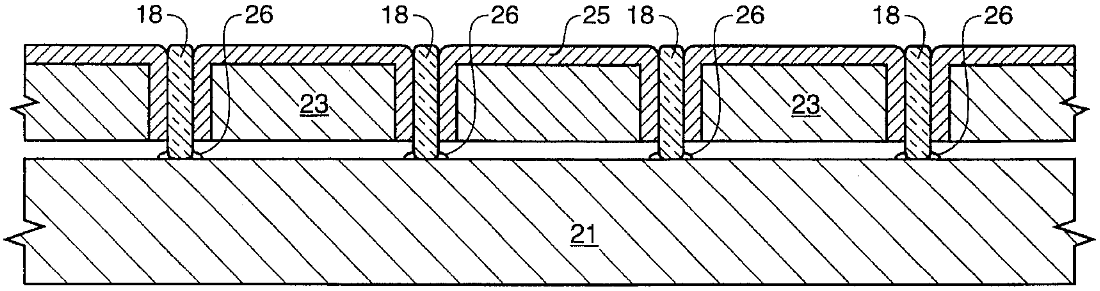
FIG. 7 is a schematic cross-section of the mold of FIG. 6, after the mold has been attached to a first electrode plate, according to the process of the present invention.

Once the adhesive material 26 has been applied to the exposed portions of the spacer material 18, the filled mold 23 is attached to one of the electrode plates 16 and 21 at the spacers 18. Once again, it is preferable that the mold 25 be attached to the baseplate 21, rather than the phosphor screen 16. FIG. 7 shows the present invention, after the mold 23 has been adhered to the baseplate 21. The mold 23 can be aligned with a great deal of accuracy, and hence, the resulting spacers 18 can be correctly aligned.

The conformal film 25 is removed by an etching process that selectively removes nitride with respect to the silicate material 18 of the spacer structures 18. Such etchants comprise hydrogen halides and fluorine-containing compounds, such as HCl and HBr, and $NF_3$ or $CHF_3$ or $CF_4$, respectively.

Once the lining film 25 is removed, the ceramic mold is lifted off the spacer structures 18. Without the lining film 25, the openings 24 are much larger, and enable the physical removal of the mold 23.

Figure 8:
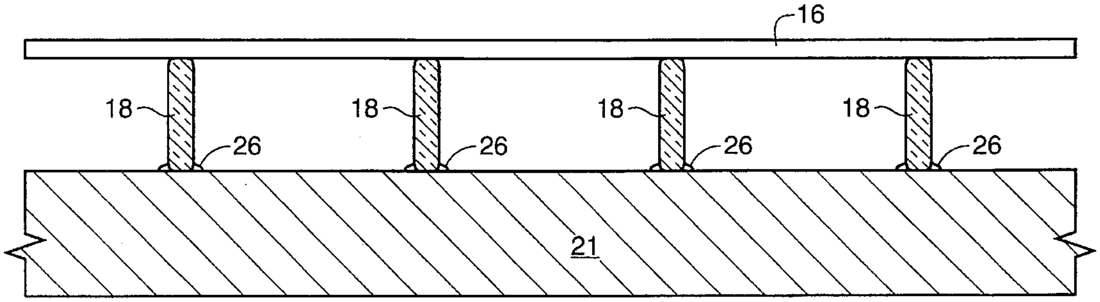
FIG. 8 is a schematic cross-section of the structure formed from the mold of FIG. 7, after the mold and film have been removed, and a second electrode plate has been attached to the exposed material, according to the process of the present invention.

After the mold 23 is removed, the protective oxide material is removed from the emitter structures (not shown), and the electrode plates 16 and 21 are sealed together. FIG. 8 illustrates the spacers 18 disposed between the electrode plates 16 and 21. The plates 16 and 21 are preferably sealed with a frit seal, and a vacuum created between the electrode plates 16 and 21.

All of the U.S. Patents cited herein are hereby incorporated by reference herein as if set forth in their entirety.

While the particular process as herein shown and disclosed in detail is fully capable of obtaining the objects and advantages herein before stated, it is to be understood that it is merely illustrative of the presently preferred embodiments of the invention and that no limitations are intended to the details of construction or design herein shown other than as described in the appended claims. For example, although the support structures of the present invention were discussed with respect to field emitter displays, the spacers of the present invention can be used in other evacuated flat panel displays, such as vacuum flourescent displays, flat CRT displays, liquid crystal displays, plasma displays, electroluminescent displays, and other displays employing a pressure differential which requires support from the outside of the display relative to the inside of the display.

What is claimed is:

1. A method for fabricating columnar supports used for an evacuated display, said method comprising the following steps:

providing a laminate, said laminate having upper and lower major surfaces;

punching a plurality of holes through said laminate, each of said holes being disposed normal to said major surfaces of said laminate, each of said holes having a diameter;

disposing a sacrificial layer about said laminate which conformally coats said major surfaces and substantially all of said holes, thereby reducing said diameter of said holes;

filling said holes with a dielectric material, thereby forming the columnar supports, etching at least a portion of said sacrificial layer from said lower major surface, thereby exposing at least a portion of the columnar supports;

disposing a high-temperature adhesive to said exposed portions of the columnar supports;

aligning and affixing said exposed portion of the columnar supports to a location on a baseplate;

substantially removing said sacrificial layer; and removing said laminate, thereby exposing the columnar supports.

2. The method for fabricating columnar supports used for an evacuated display, according to claim 1, wherein said sacrificial layer is selectively etchable with respect to said dielectric material.

3. The method for fabricating columnar supports used for an evacuated display, according to claim 2, wherein said laminate comprises a ceramic, said ceramic being unfired.

4. The method for fabricating columnar supports used for an evacuated display, according to claim 3, further comprising the step of:

firing said ceramic laminate.

5. The method for fabricating columnar supports used for an evacuated display, according to claim 4, wherein the columnar supports maintain a separation between a laminar transparent, phosphor-coated upper electrode and said baseplate, said baseplate having multiple electrodes in the display.

6. The method for fabricating columnar supports used for an evacuated display, according to claim 5, further comprising the steps of:

aligning and affixing said upper electrode to the columnar supports; and evacuating and sealing the display.

7. A method of forming inter-electrode spacers useful for flat panel display devices, said method comprising the following steps of:

placing a mold on a first electrode plate, said mold having openings with corresponding diameters;

coating said mold with a film, said film lining said openings, thereby decreasing said diameters of said openings;

filling said openings with a silicate material;

selectively removing said film; and removing said template from said electrode plate.

8. The method for fabricating spacer supports, according to claim 4, wherein said silicate comprises at least one of BPSG and spin on glass.

9. The method of forming inter-electrode spacers, according to claim 7, wherein said film is selectively etchable with respect to said silicate.

10. The method of forming inter-electrode spacers, according to claim 8, wherein said film comprises a nitride.

11. The method of forming inter-electrode spacers, according to claim 9, wherein said conformal film is selectively removed by etching in at least one of a hydrogen halide and a fluorine-containing compound.

12. The method of forming inter-electrode spacers, according to claim 11, wherein said nitride is deposited by chemical vapor deposition.

13. The method of forming inter-electrode spacers, according to claim 12, wherein said mold comprises ceramic, said mold being physically lifted from said electrode.

14. A process for the formation of inter-electrode support structures, said process comprising the following steps of:

depositing a conformal film over a template, said template having openings;

filling said openings of said template with a support material, said support material being selectively etchable with respect to said conformal film;

etching said conformal film; and removing said template from said support material, thereby exposing said inter-electrode support structures.

15. The process for the formation of inter-electrode support structures, according to claim 14, wherein said template comprises a ceramic, said openings being drilled into said ceramic.

16. The process for the formation of inter-electrode support structures, according to claim 15, wherein said openings have a diameter, said conformal film decreasing said diameter of said openings.

17. The process for the formation of inter-electrode support structures, according to claim 16, wherein said conformal film and said support material are deposited by chemical vapor deposition (CVD).

18. The process for the formation of inter-electrode support structures, according to claim 17, wherein said template has a first surface, said conformal film being removed from said first surface, thereby exposing a portion of said inter-electrode support structures.

19. The process for the formation of inter-electrode support structures, according to claim 18, wherein said exposed portion of said inter-electrode support structures is attached to a substrate, said substrate being an electrode plate.

20. The process for the formation of inter-electrode support structures, according to claim 19, wherein said inter-electrode support structures have a diameter in the range of 25–30 μm.

* * * * *